J. P. COWING.
Bell Yoke and Fastening.
No. 36,944.                                      Patented Nov. 18, 1862.
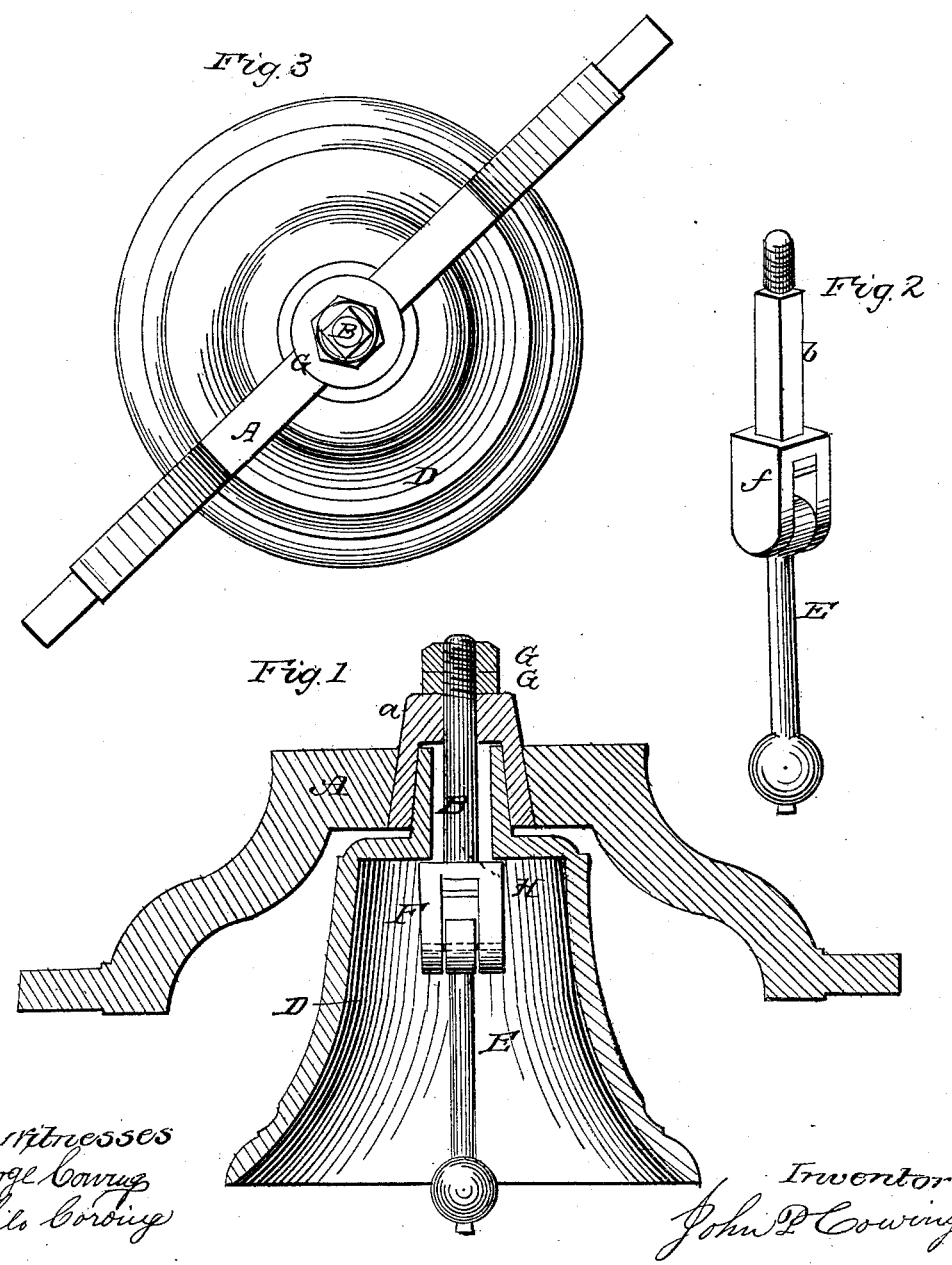

UNITED STATES PATENT OFFICE.

JOHN P. COWING, OF SENECA FALLS, NEW YORK.

IMPROVEMENT IN BELL YOKE AND FASTENING.

Specification forming part of Letters Patent No. 36,944, dated November 18, 1862.

*To all whom it may concern:*

Be it known that I, JOHN P. COWING, of Seneca Falls, in the county of Seneca and State of New York, have invented a new Improvement in Bell Yokes and Fastenings; and I hereby declare that the following is a full and exact description thereof, reference being had to the accompanying drawings, and to the letters of reference marked thereon.

Figure 1 is a sectional view; Fig. 2, a perspective view of the square bolt fastening and tongue. Fig. 3 is a vertical section.

In Fig. 1, A is the yoke, made with a square hole through it at *a*. B is a square bolt to fit nicely the hole *a* and project above the yoke A sufficient to receive the nuts G G. F is a washer with a square hole through it to fit the bolt B, and having projections or ears to hold the clapper E. C is the cone on top of the bell D, which fits a corresponding hole in the yoke A. H is a hole in the top of the bell D of sufficient size to allow the bell D to turn by the corners of the bolt B.

In Fig 2, *b* is the square bolt, with the washer *f*, with the tongue *e*, attached.

In Fig. 3, A is the yoke, B is the end of the square bolt, and G the nuts, as shown in Fig. 1. D is the bell.

The nature of my invention consists in the cheap, simple, and easy manner of securing the swing of the tongue always at right angles with the yoke, and the easy manner in which it can be made to strike at any point to suit by simply loosening the nuts G G, Fig. 1, and shifting the bell as desired.

I disclaim the cone C, as that is an old device, used long ago in the tea or dinner bells, and also claimed in the combination of George W. Hildreth's patent, granted June 19, 1855.

I also disclaim the doweled cap to the yoke, and the round hole in said cap, with a slot for the pin in the round bolt to slide in, that being essentially Hildreth's patent, mine being a square hole and square bolt to fit said hole.

I also disclaim the horns, the cap, and clevis-bolts mentioned in the claim of George R. Meneeley, of West Troy, patent dated September 7, 1858, all which comprise no part of my invention.

What I claim, and desire to secure by Letters Patent, is—

1. Making the yoke of the bell with a square hole to receive the bolt that holds the bell.

2. The bolt with four (more or less) flat sides to fit the corresponding hole in the yoke, with the hole in the top of the bell sufficiently large to turn on the corners of said bolt, for the purposes above specified.

JOHN P. COWING.

Witnesses:
GEORGE COWING,
PHILO COWING.